UNITED STATES PATENT OFFICE.

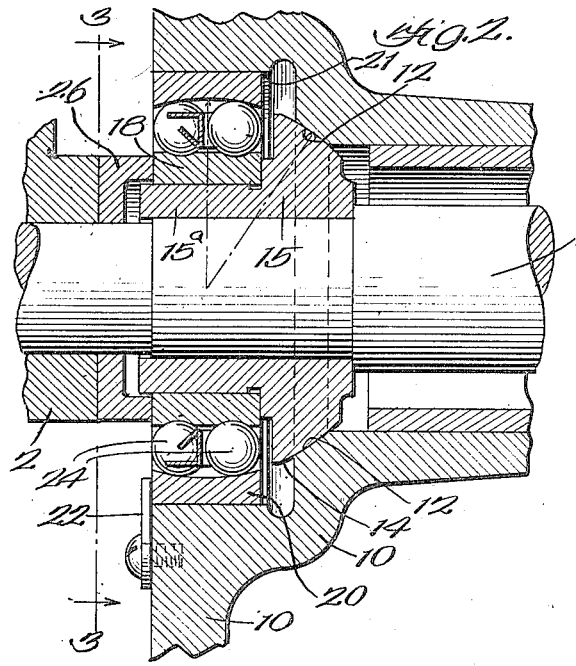
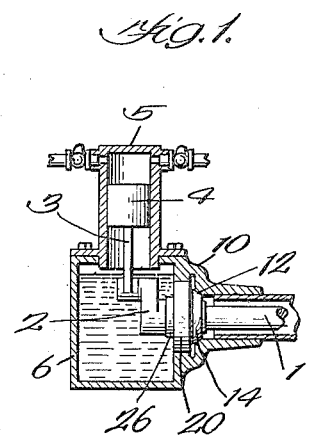
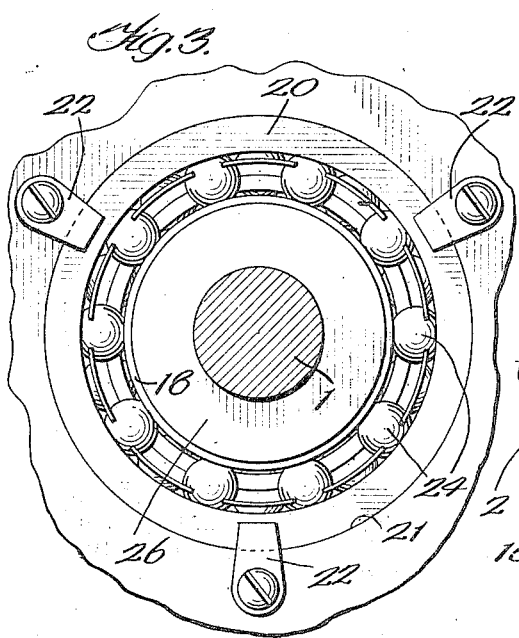
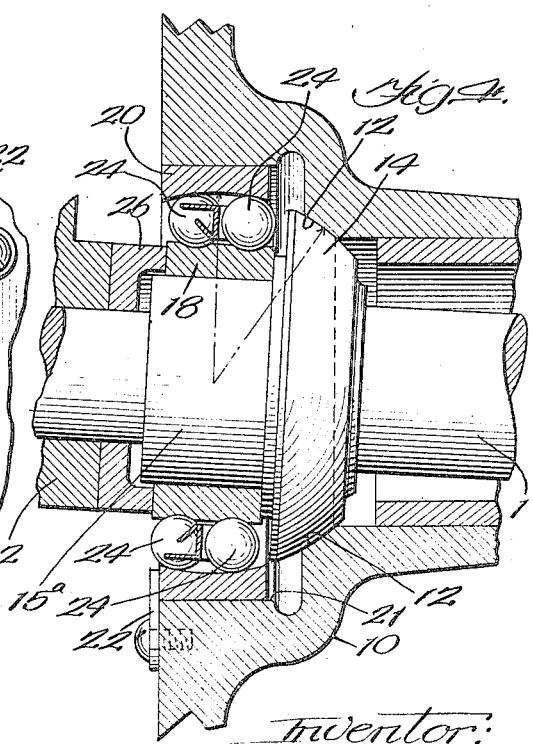

CHARLES L. McCUEN, OF CHICAGO, ILLINOIS, ASSIGNOR TO RESOLUTE MANUFACTURING COMPANY, OF CHICAGO, ILLINOIS, A CORPORATION OF ILLINOIS.

SEALED RADIUS-BEARING.

1,400,754. Specification of Letters Patent. Patented Dec. 20, 1921.

Application filed October 11, 1920. Serial No. 416,048.

*To all whom it may concern:*

Be it known that I, CHARLES L. McCUEN, a citizen of the United States, residing at Chicago, in the county of Cook and State of Illinois, have invented a certain new and useful Improvement in Sealed Radius-Bearings, of which the following is a specification.

My invention relates to sealed radius bearings, and the object is to provide a sealed bearing which will prevent a fluid under pressure from escaping through the bearing and which will, at the same time, permit the shaft to alter its alinement or angle of inclination. A second object is to so construct the bearing as to reduce the friction to a minimum. In pumps, compressors and other types of machinery it is frequently necessary to prevent the passage of fluid lengthwise of the shaft, and this is often accomplished by the aid of stuffing boxes or glands. According to my invention such expedients are dispensed with, and instead I have produced a bearing which will not only prevent passage of fluid along the shaft, but which will greatly reduce the friction and at the same time permit oscillation of the shaft in its bearing. Another object of the invention is to render it compensating in the sense that the sealing will increase in direct proportion to the increase in pressure of the fluid to be restrained. Thus, as the pressure of the fluid increases, the sealing effect will also increase; but as the pressure decreases the pressure of the sealing element upon its seat will also decrease, thus reducing the amount of friction but not permitting the escape of the fluid.

I accomplish my objects by the mechanism illustrated in the accompanying drawings in which—

Figure 1 is an assembly view more or less diagrammatic showing my bearing installed at the side of a cylinder adapted to contain fluid under pressure.

Fig. 2 is an axial section of the bearing.

Fig. 3 is a sectional view on the line 3—3, Fig. 2.

Fig. 4 is a sectional view similar to Fig. 2, but shows the shaft tilted to a different position.

Like numerals denote like parts throughout the several views.

In the form illustrated, the shaft 1 is driven by a crank 2 pivoted at its free end to a connecting rod 3 which in turn is pivoted to a plunger 4 sliding in a cylinder 5. These parts may typify a pump or any other form of power mechanism which will produce a pressure in a receptacle 6 in excess of that of the surrounding atmosphere. The purpose of the bearing proper, in addition to supporting the shaft, is to prevent the liquid contained within the receptacle 6 from escaping past the bearing. The wall 10 out of which the shaft emerges has an annular shoulder 12 which faces inward toward the receptacle 6. This shoulder is spherical, being centered at the center of the bearing and, according to the illustrated design, at a point distant from the zone or plane of said shoulder. The center in the present form is midway between the ends of the ball races hereinafter referred to. Said shoulder forms an abutment for the spherical shoulder 14 of a collar 15 which encircles the shaft. By preference said collar has a sleeve portion 15$^a$ which extends a short distance along the shaft and supports the inner ring or ball race 18 of a ball bearing. The outer ring 20 of this ball bearing fits in a suitable recess 21 in the stationary bearing 10 and is held in place by clips 22 of any suitable type. The inner surface of the outer ring is spherical and centered at a point midway between the ends of the ring and at the same point as the spherical surfaces 12, 14. Between the two rings are anti-friction balls 24. The ball bearing itself, that is, the two rings and the balls located between them, are of known construction. Ring 18 is held in place on the sleeve 15$^a$ in any appropriate manner. According to the present design it is held by a dished disk 26 which encircles the shaft and bears against the end of the ring. Said disk may be held into place by any suitable means, for example, the hub of the crank 2 previously mentioned.

In operation, the receptacle 6 is under pressure and hence the fluid in it tends to escape, especially past the shaft bearing. In my device the pressure of the fluid produces an outward thrust against the inner surface of the spherical portion 14 and presses it against the seat formed by the spherical surface 12. The result is that the greater the pressure from within the receptacle, the more closely will the spherical portion 14 seat upon the seat 12. The result is that the fluid is effectually prevented from escaping past the bearing regardless of the amount of internal pressure, for the action is self-compensating and the greater the internal pressure, the harder will the sealing ring 14 be pressed against its seat. As the sealing ring or surface 14 has a common center with the spherical inner surface of the outer ring 20 of the ball race, the shaft may rock in its bearing, that is, change its angle of inclination without decreasing the efficiency of the sealing action. This is quite important, as the reaction of the crank 2 tends to cause the shaft to "work" in its bearings, and with an ordinary bearing this would tend to let the fluid work through the bearing and escape. With my construction the shaft may rock through a considerable angle without in any way decreasing the efficiency of the sealing effect.

From the foregoing it will be seen that my bearing is a radius bearing in the sense that the shaft is free to rock or change its angle of inclination without becoming unseated. It is also a sealed bearing in the sense that for all positions of the shaft it seals the vessel in which it is mounted. The shoulder 12 is imperviously related to the wall of the receptacle whether integral with it or not; the ring 14 is imperviously related to the shoulder by making fluid-tight contact with it; and the ring is also imperviously related to the shaft in that the shaft makes a sliding or rotating fit within the ring. Thus there is no opportunity for fluid to escape out past the bearing.

Having thus described my invention, what I claim as new and desire to secure by Letters Patent is:

1. A sealed radius bearing comprising a wall of the receptacle to be sealed, and a shaft, the wall and shaft having, imperviously related to them, mating spherical surfaces centered at the axis of the bearing and toward the inside of the receptacle to be sealed.

2. In a device of the class described, a wall having a spherical annular shoulder sealed to it, a shaft and an element sealed to said shaft and having a spherical annular surface adapted to closely fit and make surface contact with said shoulder, the spherical surfaces being centered at some point on the axis of the bearing toward the inside of the receptacle.

3. In a sealed bearing, the combination, with the receptacle which it is desired to seal, of an annular element having a spherical surface imperviously related to the wall of the receptacle, a shaft, and a ring making fluid-tight connection with the shaft and having a spherical, annular surface adapted to make fluid-tight contact with said annular spherical element, said spherical surfaces being struck from a center which is coincident with the axis of the bearing and distant from the zone of said spherical surfaces whereby the shaft may change its angle of inclination.

4. A sealed radius bearing comprising a wall of the receptacle to be sealed, a shaft, the wall and shaft having, imperviously related to them, mating spherical surfaces centered at the axis of the bearing at a point toward the inside of the receptacle, and a radius ball bearing centered at the same point as said spherical surfaces.

5. In combination, a receptacle having a spherical surface formed in one wall, facing inward, and centered at the axis of the bearing, a shaft, a ring on said shaft making sealed contact therewith and having a spherical surface making sealed contact with the first mentioned spherical surface, and a ball bearing having a spherical surface concentric with the spherical surface first mentioned.

6. In combination, a receptacle to be sealed, a shaft and a radius bearing for the shaft in one wall of the receptacle, said radius bearing comprising an annular shoulder imperviously related to the walls of the receptacle, said shoulder being spherical and facing inward, a ring on the shaft making fluid-tight contact therewith and having a spherical surface making sealed contact with said shoulder, the ring having an integral sleeve in which the shaft is rotatable and a ball bearing having an inner and an outer ball race, the inner ball race being mounted on said sleeve and the outer ball race being stationary and having its inner surface spherical and concentric with said shoulder.

In witness whereof, I have hereunto subscribed my name.

CHARLES L. McCUEN.